United States Patent
Baker et al.

(10) Patent No.: US 7,327,715 B2
(45) Date of Patent: Feb. 5, 2008

(54) RADIO COMMUNICATION SYSTEM

(75) Inventors: Matthew P. J. Baker, Canterbury (GB); Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1087 days.

(21) Appl. No.: 10/105,499

(22) Filed: Mar. 25, 2002

(65) Prior Publication Data

US 2002/0141377 A1 Oct. 3, 2002

(30) Foreign Application Priority Data

Mar. 27, 2001 (GB) ................................. 0107578.7

(51) Int. Cl.
*H04J 3/24* (2006.01)
(52) U.S. Cl. .................................... 370/349; 370/394
(58) Field of Classification Search ................ 370/328, 370/474, 329, 333, 341, 349, 394, 465; 375/130, 375/346, 347, 348, 340
See application file for complete search history.

(56) References Cited

U.S. PATENT DOCUMENTS

| | | | |
|---|---|---|---|
| 5,574,984 A * | 11/1996 | Reed et al. | 455/69 |
| 5,585,805 A | 12/1996 | Takenaka et al. | 342/461 |
| 6,831,940 B2 * | 12/2004 | Harms et al. | 375/130 |
| 2001/0043641 A1 * | 11/2001 | Harms et al. | 375/130 |
| 2004/0017867 A1 * | 1/2004 | Thomas et al. | 375/346 |
| 2004/0264605 A1 * | 12/2004 | Kyosti et al. | 375/340 |

FOREIGN PATENT DOCUMENTS

| | | |
|---|---|---|
| EP | 1079539 A2 | 2/2001 |
| WO | WO9631014 | 3/1996 |
| WO | WO0033479 | 6/2000 |

OTHER PUBLICATIONS

JD Parsons, "The Mobile Radio Propagation Channel", Second edition, Wiley, 2000, chapter 5.

* cited by examiner

*Primary Examiner*—Ajit Patel
(74) *Attorney, Agent, or Firm*—Larry Liberchuk

(57) ABSTRACT

A radio communication system comprises a primary station adapted to transmit a series of data packets on a downlink channel to a secondary station. The primary station determines a property relating to the Doppler spread of the downlink channel and uses this property in the determination of suitable parameters for packet transmission. Possible properties from which an indication of the Doppler spread can be derived include the received signal to interference ratio and the transmitted power control commands. Possible parameters for packet transmission include transmission power, modulation and coding scheme, delay before retransmission of a packet received in error, and spreading factor.

By determining packet transmission parameters based on uplink signal properties or on transmitted power control commands, the need for the secondary station to measure radio channel properties and signal these to the primary station is removed, thereby reducing signalling traffic and overall interference levels and extending battery life.

15 Claims, 1 Drawing Sheet

RADIO COMMUNICATION SYSTEM

The present invention relates to a radio communication system and further relates to a primary station for use in such a system and to a method of operating such a system. While the present specification describes a system with particular reference to the emerging Universal Mobile Telecommunication System (UMTS), it is to be understood that such techniques are equally applicable to use in other mobile radio systems.

In a packet radio communication system, data for transmission from a primary station to a secondary station is divided into data packets including some error-checking information, for example a check sum. Any packets which are received in a corrupted state are retransmitted by the primary station on receipt of a Negative ACKnowledgement (NACK) message from the secondary station. As an alternative to retransmission of the complete data packet, the primary station may transmit error correction information relating to the packet to the secondary station in response to a NACK.

Such systems are suited to the transmission of data which is not time-critical, unlike voice transmission. There is a growing demand in the mobile communication area for a system having the ability to download large blocks of data to a Mobile Station (MS) on demand at a reasonable rate. Such data could for example be web pages from the Internet, possibly including video clips or similar. Typically a particular MS will only require such data intermittently, so fixed bandwidth dedicated links (as might be set up for voice traffic) are not appropriate. As one example of such a system, a High-Speed Downlink Packet Access (HSDPA) scheme is being developed for UMTS which may facilitate transfer of packet data to a mobile station at up to 4 Mbps.

There are a number of parameters which the primary station needs to set for the first transmission of a packet, as well as for subsequent transmissions and retransmissions. Such parameters may include the transmission power, Modulation and Coding Scheme (MCS), spreading factor and number of channelisation codes (in a spread-spectrum system such as UMTS), size of the data packet transmitted, and delay between retransmissions of a particular packet (or the transmission priority assigned for retransmissions).

Known techniques for selecting suitable values for these parameters generally require the secondary station to transmit measurements, providing information such as the secondary station's transmission power (from which the primary station can estimate path loss) or a direct estimate of the path loss. However, these known techniques have the drawback of requiring the secondary station to signal a significant amount of information to the primary station, thereby increasing interference levels in the system and shortening the secondary station's battery life.

Our co-pending unpublished International patent applications PCT/EP01/03138 and PCT/EP01/01548 (Applicant's references PHGB000038 and PHGB000039 respectively) disclose means for choosing appropriate power control parameters for transmissions from a secondary station depending on properties of signals received by or power control commands transmitted by a primary station. These latter techniques are effective because the choice of power control parameters is largely dependent on the Doppler spread of the radio channel (where the Doppler spread is defined as the maximum difference between the frequency of a signal as received by a receiving station and the frequency at which the signal was transmitted, see for example J D Parsons, *The Mobile Radio Propagation Channel*, Second Edition, Wiley, 2000, chapter 5). This Doppler spread is often closely related to the speed at which the secondary station is moving. U.S. Pat. No. 5,585,805 discloses a method by which a mobile terminal can determine its velocity based on measurements made by two receiving circuits, which has the disadvantage that two receivers are required.

An object of the present invention is to provide improved selection of parameters for packet transmission without the need for additional signalling.

According to a first aspect of the present invention there is provided a radio communication system comprising a primary station having means for transmitting a series of data packets on a downlink channel to a secondary station and means for receiving information from the secondary station on an uplink channel, wherein the primary station has means for determining a property relating to the Doppler spread of the downlink channel and means for determining a value for a transmission parameter relating to a transmission of a data packet from the series of data packets, the selected parameter value depending at least partly on the determined property.

By arranging for the primary station to determine itself a property relating to the Doppler spread of the downlink channel and determining packet transmission parameters based on this property, the need for the secondary station to measure radio channel properties and signal these to the primary station is reduced, thereby reducing signalling traffic and overall interference levels and extending battery life. The property relating to the Doppler spread may for example be determined from the received uplink signal to interference ratio or the transmitted power control commands. Possible parameters for packet transmission include transmission power, modulation and coding scheme, delay before retransmission of a packet received in error, and spreading factor.

According to a second aspect of the present invention there is provided a primary station having means for transmitting a series of data packets on a downlink channel to a secondary station and means for receiving information from the secondary station on an uplink channel, wherein means are provided for determining a property relating to the Doppler spread of the downlink channel and for determining a value for a transmission parameter relating to a transmission of a data packet from the series of data packets, the selected parameter value depending at least partly on the determined property.

According to a third aspect of the present invention there is provided a method of operating a radio communication system comprising a primary station arranged to transmit a series of data packets on a downlink channel to a secondary station and to receive information from the secondary station on an uplink channel, the method comprising the primary station determining a property relating to the Doppler spread of the downlink channel and determining a value for a transmission parameter relating to a transmission of a data packet from the series of data packets, the selected parameter value depending at least partly on the determined property.

The present invention is based upon the recognition, not present in the prior art, that parameters for transmission of data packets by a primary station can be determined based on properties of uplink signals or on power control commands relating to the downlink channel.

Embodiments of the present invention will now be described, by way of example, with reference to the accompanying drawings, wherein.

Figure 1:
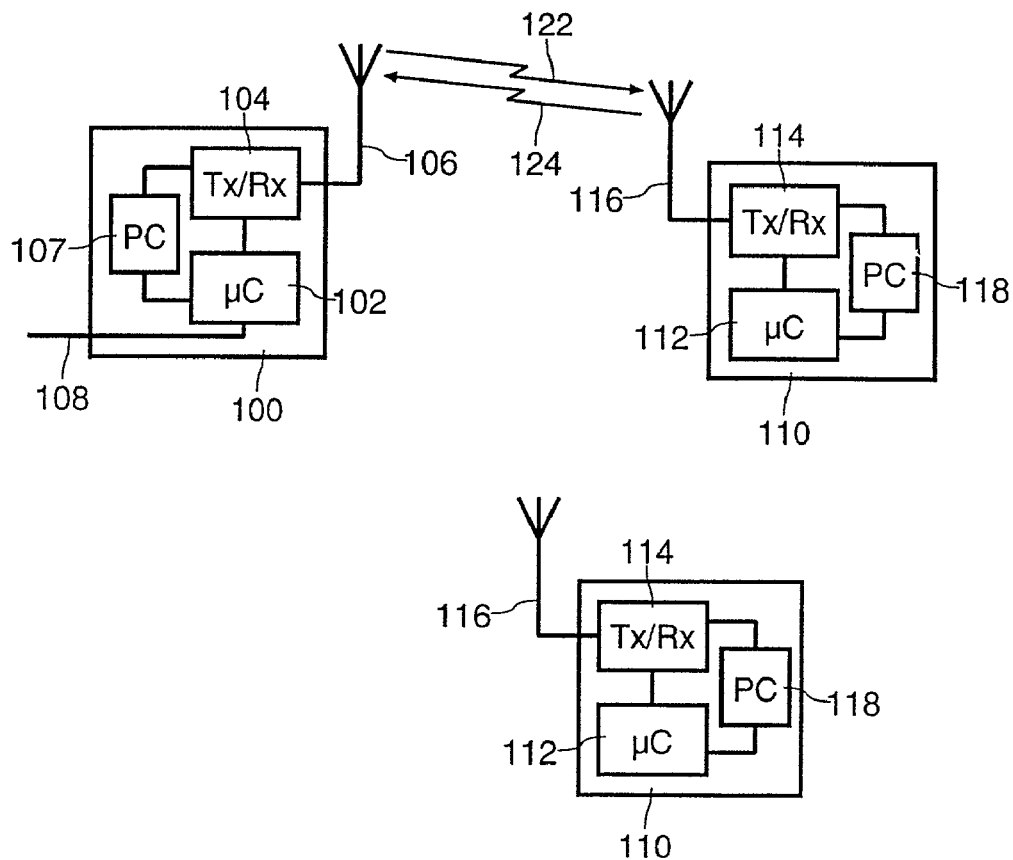
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

In a UMTS system as presently specified, the aim of the uplink power control is to maintain the Signal-to-Interference Ratio (SIR) of the signal received by the BS 100 at a given target level by instructing the MS 110 to alter its transmission power. These instructions are conveyed by two-state Transmit Power Control (TPC) commands, normally transmitted once per time slot (there being 15 time slots per 10 ms frame) but transmitted less often in gated mode (which mode is currently being specified) when only a fraction of the time slots in a frame are used. The size of steps is controlled by two parameters, PCA (Power Control Algorithm) and $\Delta_{TPC}$ (uplink Transmit Power Control step size), resulting in the availability of three effective power control step sizes.

When the value of PCA is 1, $\Delta_{TPC}$ can take a value of 1 or 2. If a received TPC command is "0" then the MS 110 reduces its transmission power by $\Delta_{TPC}$ dB, while if the received command is "1" the MS 110 increases its transmission power by $\Delta_{TPC}$ dB.

When the value of PCA is 2, $\Delta_{TPC}$ can only take the value of 1 and the MS 110 combines TPC commands in groups of five. If all five TPC commands are "1" the transmission power is increased by $\Delta_{TPC}$ dB, if all five TPC commands are "0" the transmission power is decreased by $\Delta_{TPC}$ dB, otherwise the transmission power is unchanged. This method effectively emulates the use of a power control step size of approximately 0.2 dB, as disclosed in our International patent application WO 00/74260.

For the basic inner loop power control in a UMTS system, the BS 100 measures the value of the received SIR in every time slot (although measurements could be made more or less frequently). If the received SIR is greater than the target level then the next TPC command sent to the MS 110 by the BS 100 is a "0" (instructing the MS 110 to reduce its transmission power), otherwise the next TPC command is a "1" (instructing the MS 110 to increase its transmission power).

Analysis of the statistical properties of the sequence of TPC commands sent to the MS 110 can be used to derive properties relating to the Doppler spread of the uplink channel 124. Consider some example scenarios:

A regularly alternating sequence of TPC commands indicates that the SIR of the signal on the uplink channel 124 remains very close to the SIR threshold, indicating a very slowly-changing radio channel and a low Doppler spread.

Sequences of identical TPC commands indicate that the uplink channel 124 is changing more rapidly with a higher Doppler spread.

Apparently random sequences of TPC commands indicate that the rate of change of the uplink channel 124 is greater than the update rate of the inner loop power control, typically indicating a high Doppler spread.

Further statistical analysis of the transmitted TPC commands is also possible to derive more information about properties relating to the Doppler spread of the uplink channel 124, in addition to or instead of the above examples. Suitable parameters for analysis could include:

an average net requested change in uplink power, determined over a fixed or sliding time period; and a time-weighted average change in uplink power requested, determined over a fixed or sliding time period, where for example the most recent changes could be assigned a higher weight than earlier changes.

Either of these parameters could for example be calculated recursively and updated every timeslot using the value of the latest TPC command.

Properties of the uplink channel 124 can also be measured directly by the BS 100. For example, measurements of the received SIR can be used to calculate an average value of the magnitude of the rate of change of SIR, typically the rms value of d(SIR)/dt. Simulations have shown that the rms change of SIR per timeslot (when based on one SIR measurement per slot) is closely correlated to the fading rate of the channel, even in the presence of inner loop power control. Further simulations determined that the rms averaging process needs to be carried out over a significant number of frames, with averaging over for example 30 frames (i.e. 0.3 seconds) giving good results. Other properties relating to the uplink channel 124 could also be measured by the BS 100, including for example received signal power and Eb/No (energy per bit/noise density).

There will generally be a frequency spread due to Doppler effects, with the maximum fading rate being determined by the Doppler spread. As an example, simulations discussed in PCT/EP01/03138 showed that values of d(SIR)/dt between 1.2 and 2.6 implied a Doppler spread of between 55 and 150 Hz, which is likely to arise from a MS 110 moving at between 30 and 80 km/h.

In an embodiment of a system made in accordance with the present invention, the techniques of analysing the pattern of TPC commands transmitted to a MS 110 and/or of analysing the variations in a received signal from a MS 110 are taken into account in choosing the MCS for packet transmission from the BS 100 to the MS 110. This information may be used to set parameters for the first transmission of a packet and/or any subsequent retransmissions of the packet. By making use of information which can be derived directly by the BS 100, the amount of information which has to be transmitted on the uplink channel 124 can be reduced.

Figure 2:
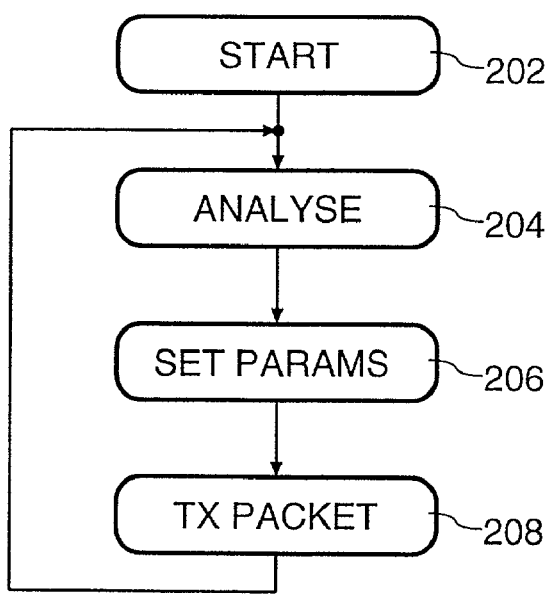
FIG. 2 is a flow chart illustrating a method in accordance with the present invention for determining packet transmission parameters.

FIG. 2 is a flow chart summarising a method of operating such a system. The method begins, at step 202, when the BS 100 has data packets for transmission to the MS 110. The BS 100 analyses, at step 204, the pattern of TPC commands that it has transmitted over the downlink channel 122 to the MS 110. An an alternative, the BS 100 could analyse variations in signals received from the MS 110. The results of the analysis are indicative of the Doppler spread of the uplink channel, and can in general be taken to be indicative of the approximate Doppler spread of the downlink channel (since the Doppler spread is largely dependent on the speed of the MS 110), enabling them to be used, at step 206, to set parameters for packet transmission. The BS 100 then, at step 208, transmits one or more packets using these parameters before returning to step 204 to repeat the analysis of TPC commands.

As a specific example, knowledge of the Doppler spread could be used to help to determine the optimum modulation scheme. Simulation results have shown that use of 64-QAM (Quadrature Amplitude Modulation) can significantly degrade the FER (Frame Error Rate) in multipath channels if the MS 110 is moving fast (and hence has a high Doppler spread). Hence, the Doppler spread determined using one or more of the above techniques could be used to determine whether use of a high-order modulation scheme such as 64-QAM is beneficial.

The Doppler spread, which is usually largely due to the speed of the MS 110, affects the statistics of packet errors, in particular the probability that a retransmission of a failed packet would also fail. Consider for example a situation where the first transmission of a packet is received in error due to a fade. If the fading frequency of the downlink channel 122 is low, then it is likely that a quick retransmission of the failed packet would also fail, as the probability of the channel 122 still being in fade is high.

If the fading frequency is higher, it becomes difficult to predict any correlation between the known status of a first transmission of a particular packet and the probability of failure of a retransmission of the packet. In these circumstances, applying additional delay to the retransmission of a failed packet would, on average, make no difference to the probability of the retransmission succeeding.

Hence, as a general principle, it is beneficial to delay retransmissions for a longer period if the Doppler spread is low (generally indicating a slowly-moving MS 110), but to retransmit as quickly as possible if the Doppler spread is higher (generally indicating a rapidly-moving MS 110). The methods described above for analysing received signal variations and/or transmitted TPC command patterns can be used to derive an indication of whether the Doppler spread is high or low, and hence what the optimum retransmission delay should be. Routine system simulations would be used to determine suitable thresholds for regarding a Doppler spread as high or low, as well as for determining suitable retransmission delays depending on the Doppler spread.

As an alternative, or in addition, to the above, the information on Doppler spread obtained from analysing received signal variations and/or transmitted TPC command patterns could be used in the determination of a suitable power level for a retransmission. For example, if the Doppler spread is low, a higher power could be used for fast retransmissions compared with that used with higher Doppler spreads for the same retransmission delay. Similarly, information that the Doppler spread is low could be exploited by deciding to use more redundancy and/or a more robust coding scheme and/or a lower order modulation scheme for fast retransmissions.

As a further alternative or addition to the above, the information on Doppler spread could be used in the determination of a suitable size of data packet for transmission i.e. the number of data bits included in a packet). For example, when the Doppler spread is large it could be beneficial to reduce the size of data packets.

The present invention is applicable to systems in which measured or estimated properties of the uplink channel 124 are used in setting packet transmission parameters on the downlink channel 122. The description above relates to the BS 100 determining appropriate settings for packet transmission parameters. In practice the setting of parameter values may be the responsibility of a variety of parts of the fixed infrastructure, for example in a "Node B", which is the part of the fixed infrastructure directly interfacing with a MS 110, or at a higher level in the Radio Network Controller (RNC). In this specification, the use of the term "base station" or "primary station" is therefore to be understood to include the parts of the network fixed infrastructure responsible for the determining and setting of parameter values.

As well as their use in transmission of data packets from a BS 100 to a MS 110, the techniques described may also be used to select suitable parameters for packet transmission in the reverse direction. In this case, the roles of the BS 100 and MS 110 would be reversed in the description above, with the BS 100 adopting the role of a secondary station and the MS 110 the role of a primary station.

From reading the present disclosure, other modifications will be apparent to persons skilled in the art. Such modifications may involve other features which are already known in the design, manufacture and use of radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A primary station comprising:
   means for transmitting a series of data packets on a downlink channel to a secondary station and
   means for receiving information from the secondary station on an uplink channel, wherein means are provided:
   for determining a property relating to the Doppler spread of the downlink channel from power control commands transmitted to the secondary station and
   for determining a value for a transmission parameter relating to a transmission of a data packet from the series of data packets, the selected parameter value depending at least partly on the determined property.

2. The primary station of claim 1, wherein the transmission parameter includes at least one of:
   transmission power for the packet;
   a modulation and coding scheme for the packet;
   a delay before retransmission if the packet is received in error; and
   a spreading factor of the packet.

3. The primary station of claim 1, wherein means are provided for determining the property relating to the Doppler spread from a characteristic derived from the uplink channel.

4. The primary station of claim 3, wherein the characteristic derived from the uplink channel is a rate of change of received signal to interference ratio averaged over a predetermined period.

5. The primary station of claim 1, wherein means are provided for determining the property relating to the Doppler spread from one of:
   a sequence of power control commands issued by the primary station over a predetermined period;
   an average change in uplink power requested by the primary station over a predetermined period; and
   a time-weighted average change in uplink power requested by the primary station.

6. A method of operating a radio communication system comprising a primary station arranged to transmit a series of data packets on a downlink channel to a secondary station and to receive information from the secondary station on an uplink channel, the method comprising, at the primary station:

determining a property relating to the Doppler spread of the downlink channel from power control commands transmitted to the secondary station, and determining a value for a transmission parameter relating to a transmission of a data packet from the series of data packets, the selected parameter value depending at least partly on the determined property.

7. The method of claim 6, wherein the transmission of a data packet is a retransmission of a data packet received in error.

8. The method of claim 6, wherein the transmission of a data packet is a transmission of error correction information relating to a data packet received in error.

9. The method of claim 6, wherein determining the property relating to the Doppler spread is based on measured characteristics of the uplink channel.

10. The method of claim 9, wherein the property relating to the Doppler spread includes the rate of change of received signal to interference ratio averaged over a predetermined period.

11. The method of claim 6, wherein determining the property relating to the Doppler spread is based on at least one of:
a sequence of power control commands issued by the primary station over a predetermined period;
an average change in uplink power requested by the primary station over a predetermined period; and
a time-weighted average change in uplink power requested by the primary station.

12. A system comprising:
a transmitter that is configured to transmit data packets to a station on a downlink channel, and
a receiver that is configured to receive information from the station on an uplink channel, wherein the transmitter is configured to:
determine a property relating to a Doppler spread of the downlink channel based on a rate of change of received signal to interference ratio averaged over a predetermined period, and
determine a value for a transmission parameter relating to a transmission of a data packet from the series of data packets, the selected parameter value depending at least partly on the determined property.

13. The system of claim 12, wherein the transmission parameter includes at least one of:
transmission power for the packet;
a modulation and coding scheme for the packet;
a delay before retransmission if the packet is received in error; and
a spreading factor of the packet.

14. The system of claim 12, wherein the transmission of a data packet is a retransmission of a data packet received in error.

15. The system of claim 12, wherein the transmission of a data packet is a transmission of error correction information relating to a data packet received in error.

* * * * *